US012600355B2

(12) United States Patent
Yoshida

(10) Patent No.: US 12,600,355 B2
(45) Date of Patent: Apr. 14, 2026

(54) DRIVING ASSISTANCE APPARATUS AND DRIVING ASSISTANCE APPARATUS PROCESSING METHOD

(71) Applicant: TOYOTA JIDOSHA KABUSHIKI KAISHA, Toyota (JP)

(72) Inventor: Yuko Yoshida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 18/495,208

(22) Filed: Oct. 26, 2023

(65) Prior Publication Data

US 2024/0140420 A1 May 2, 2024

(30) Foreign Application Priority Data

Nov. 1, 2022 (JP) .................................. 2022-175453

(51) Int. Cl.
| | |
|---|---|
| *B60W 30/14* | (2006.01) |
| *B60W 30/18* | (2012.01) |
| *B60W 40/072* | (2012.01) |
| *G06V 20/56* | (2022.01) |
| *G06V 20/58* | (2022.01) |

(52) U.S. Cl.
CPC .... *B60W 30/143* (2013.01); *B60W 30/18154* (2013.01); *B60W 40/072* (2013.01); *G06V 20/58* (2022.01); *G06V 20/588* (2022.01); *B60W 2420/403* (2013.01); *B60W 2552/30* (2020.02); *B60W 2552/53* (2020.02); *B60W 2554/4042* (2020.02); *B60W 2554/80* (2020.02); *B60W 2556/40* (2020.02); *B60W 2556/50* (2020.02)

(58) Field of Classification Search
CPC ......... B60W 30/143; B60W 30/18154; B60W 40/072; B60W 2420/403; B60W 2552/30; B60W 2552/53; B60W 2554/4042; B60W 2554/80; B60W 2556/40; B60W 2556/50; G06V 20/58; G06V 20/588
See application file for complete search history.

(56) References Cited

U.S. PATENT DOCUMENTS

| | | | |
|---|---|---|---|
| 8,355,851 | B2 | 1/2013 | Inoue et al. |
| 8,370,040 | B2 | 2/2013 | Inoue et al. |

(Continued)

FOREIGN PATENT DOCUMENTS

| | | |
|---|---|---|
| JP | 5221959 B2 | 6/2013 |
| JP | 5821959 B2 | 11/2015 |
| WO | 2006/073508 A1 | 7/2006 |

*Primary Examiner* — Aniss Chad
(74) *Attorney, Agent, or Firm* — Sughrue Mion, PLLC

(57) ABSTRACT

The driving assistance apparatus includes an entrance width acquisition unit configured to acquire an entrance width of a roundabout in front of the vehicle based on an image captured by a front camera of the vehicle, or position information and map information of the vehicle, an other vehicle passage time calculation unit configured to calculate a passage time when another vehicle traveling in the roundabout passes the entrance width based on the image captured by the front camera of the vehicle, a vehicle speed estimation unit configured to estimate a vehicle speed of the other vehicle based on the entrance width and the passage time, and a vehicle speed setting unit configured to set a set vehicle speed for roundabout traveling based on the vehicle speed of the other vehicle.

2 Claims, 4 Drawing Sheets

(56)     References Cited

U.S. PATENT DOCUMENTS

| | | |
|---|---|---|
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2019/0295419 A1 | 9/2019 | Tosa et al. |
| 2019/0295420 A1* | 9/2019 | Fu ........................... G06T 7/248 |
| 2023/0022820 A1* | 1/2023 | Ogino ................. B60T 8/17558 |

* cited by examiner

DRIVING ASSISTANCE APPARATUS AND DRIVING ASSISTANCE APPARATUS PROCESSING METHOD

CROSS-REFERENCE TO RELATED APPLICATIONS

This application is based upon and claims the benefit of priority from Japanese Patent Application No. 2022-175453, filed on Nov. 1, 2022. The entire contents of which are incorporated herein by reference.

TECHNICAL FIELD

The present disclosure relates to a driving assistance apparatus and a method of processing a driving assistance apparatus.

BACKGROUND

U.S. Pat. No. 5,221,959 is known as a technical document concerning conventional driving assistance apparatus. This document shows a device that performs deceleration control when entering a roundabout by considering the curvature of the roundabout.

SUMMARY

The conventional device does not have a function to control vehicle speed after entering a roundabout. Therefore, the driver is required to control the vehicle speed after entering a roundabout. However, controlling vehicle speed at roundabouts is not easy. Driving through a roundabout at the decelerated speed at the time of entering the roundabout may cause traffic congestion. On the other hand, other vehicles often drive at a slower speed than normal in order to exit the roundabout immediately, and if the vehicle tries to drive through the roundabout by returning to the normal cruise control speed setting, it may inadvertently approach other vehicles in front, which is not appropriate.

BRIEF DESCRIPTION OF THE DRAWINGS

According to an aspect of the present disclosure, a driving assistance apparatus for performing vehicle speed assist control for driving a vehicle at a predetermined set vehicle speed. This apparatus includes an entrance width acquisition unit configured to acquire an entrance width of roundabout in front of the vehicle based on a captured image of a front camera of the vehicle, or position information of the vehicle and map information, an other vehicle passage time calculation unit configured to calculate a passage time at which another vehicle traveling in the roundabout passes through the entrance width based on the captured image of the front camera, a vehicle speed estimation unit configured to estimate a vehicle speed of the other vehicle based on the entrance width and the passage time, and a vehicle speed setting unit configured to set a set vehicle speed for roundabout traveling of the vehicle based on a vehicle speed of the other vehicle estimated by the vehicle speed estimation unit.

In the driving assistance apparatus according to an aspect of the present disclosure, the entrance width acquisition unit acquires a curvature of the roundabout and adjusts the entrance width based on the curvature of the roundabout.

According to another aspect of the present disclosure, there is provided a driving assistance apparatus processing method for performing vehicle speed assist control for driving a vehicle at a predetermined set vehicle speed. The method includes acquiring an entrance width of roundabout in front of the vehicle based on a captured image of a front camera of the vehicle, or position information of the vehicle and map information, calculating a passage time at which another vehicle traveling in the roundabout passes through the entrance width based on the captured image of the front camera, estimating a vehicle speed of the other vehicle based on the entrance width and the passage time; and setting a set vehicle speed for roundabout traveling of the vehicle based on a vehicle speed of the other vehicle estimated.

BRIEF DESCRIPTION OF THE DRAWINGS

According to one aspect and another aspect of the present disclosure, a set vehicle speed for roundabout driving of a vehicle can be appropriately set.

BRIEF DESCRIPTION OF THE DRAWINGS

Figure 1:
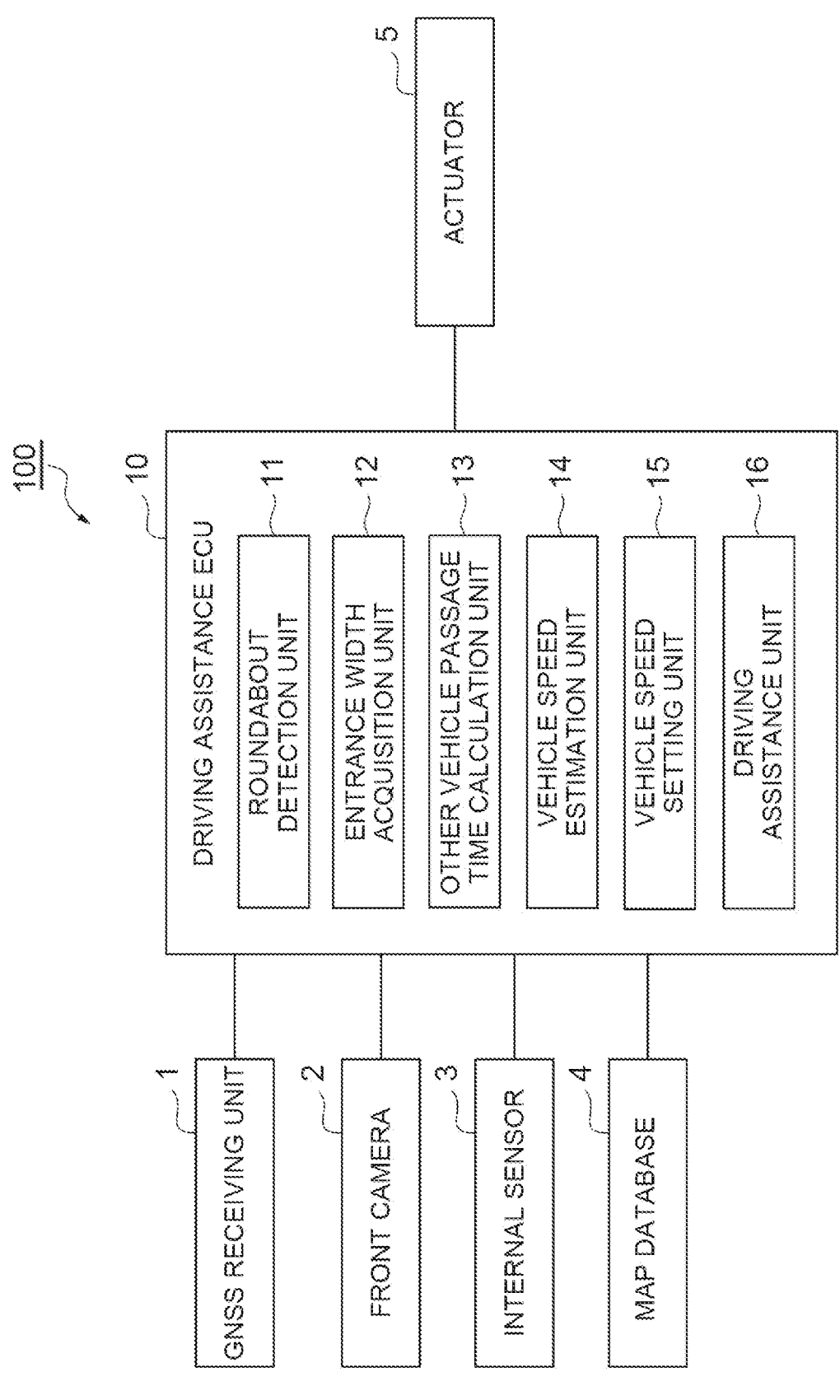

FIG. 1 is a block diagram illustrating a driving assistance apparatus according to one embodiment.

Figure 2:
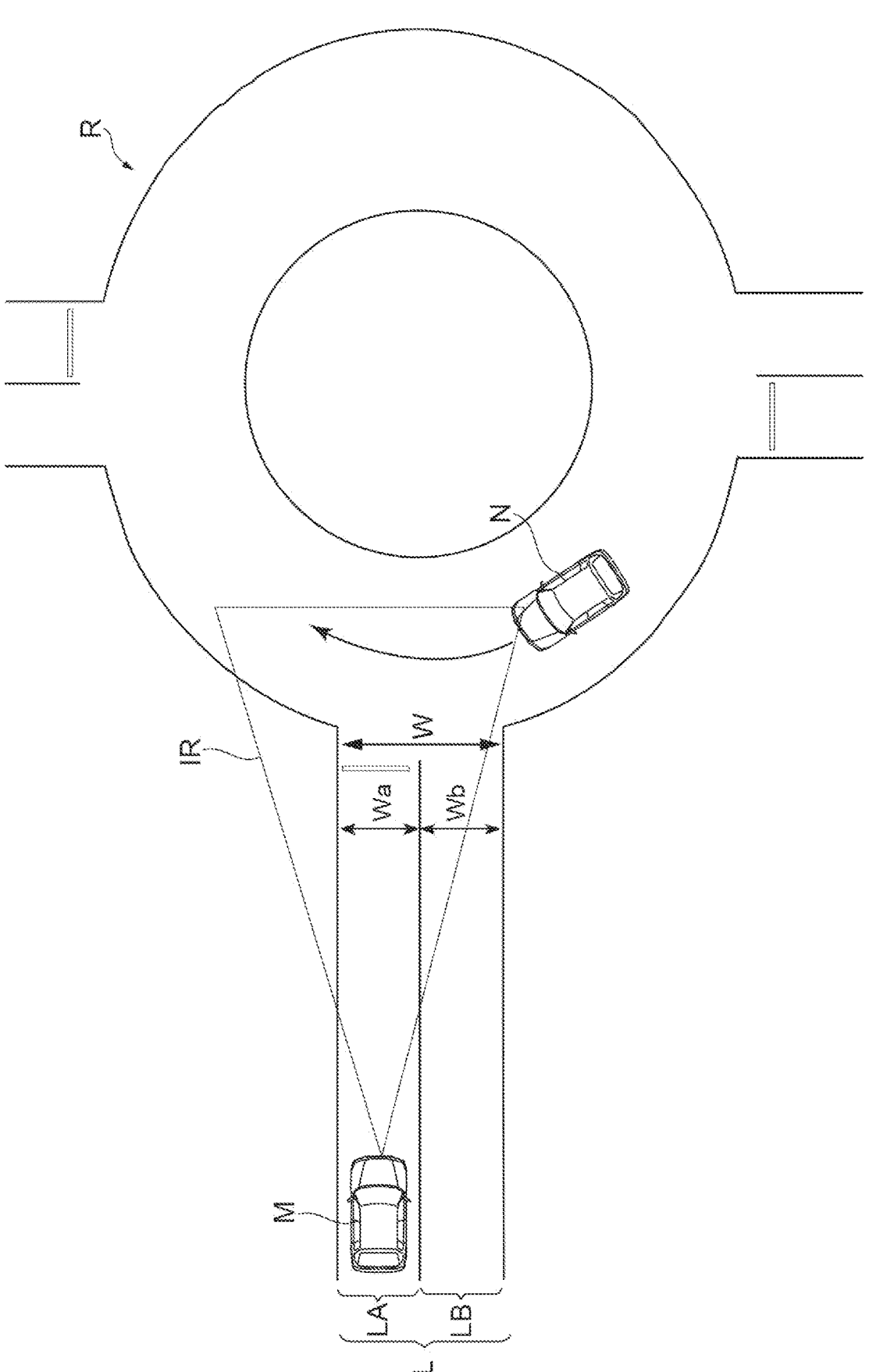

FIG. 2 is a diagram illustrating an example of a situation during roundabout approach of vehicles.

Figure 3:
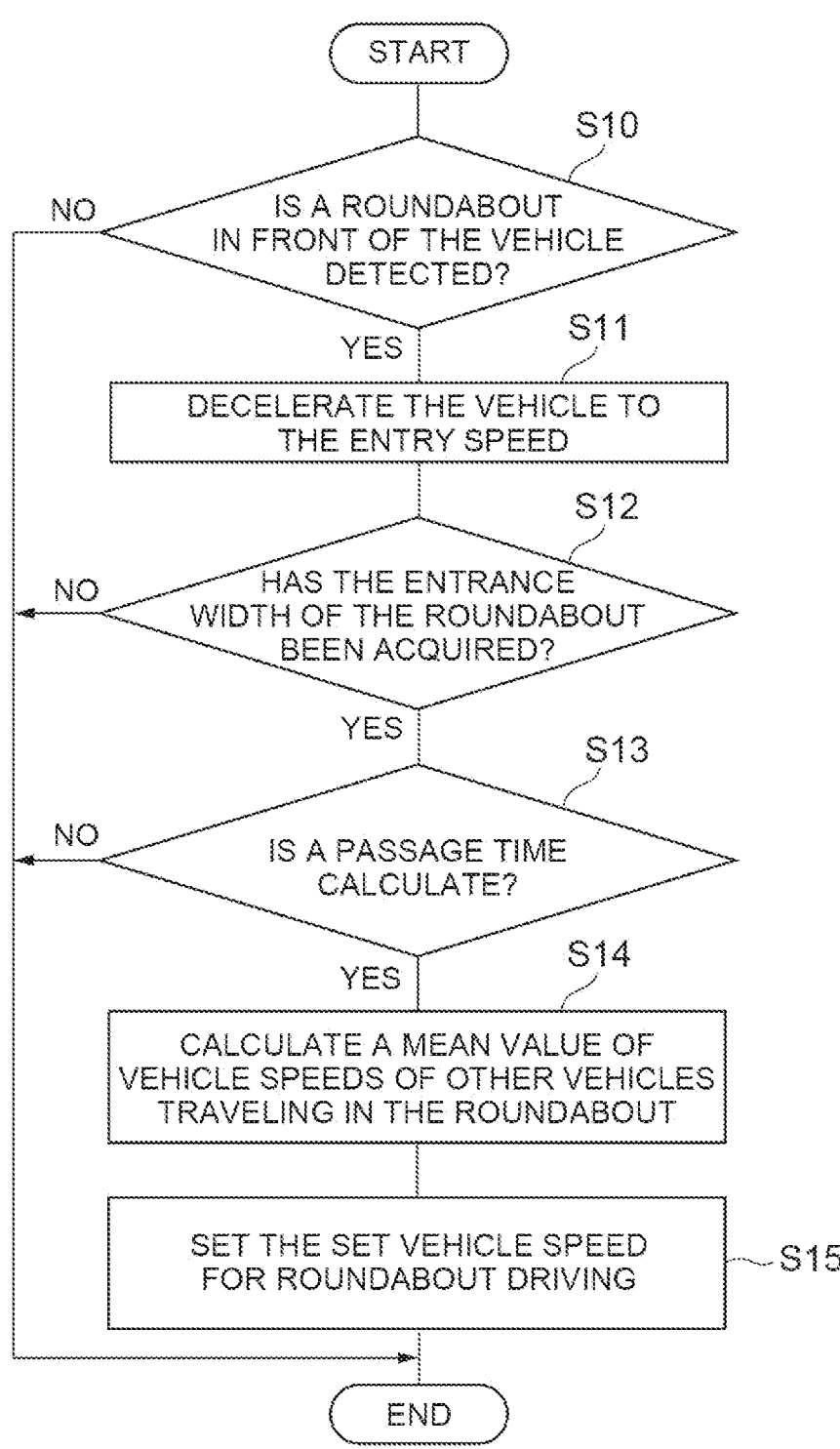

FIG. 3 is a flowchart illustrating an example of vehicle speed setting processing for roundabout driving.

Figure 4:
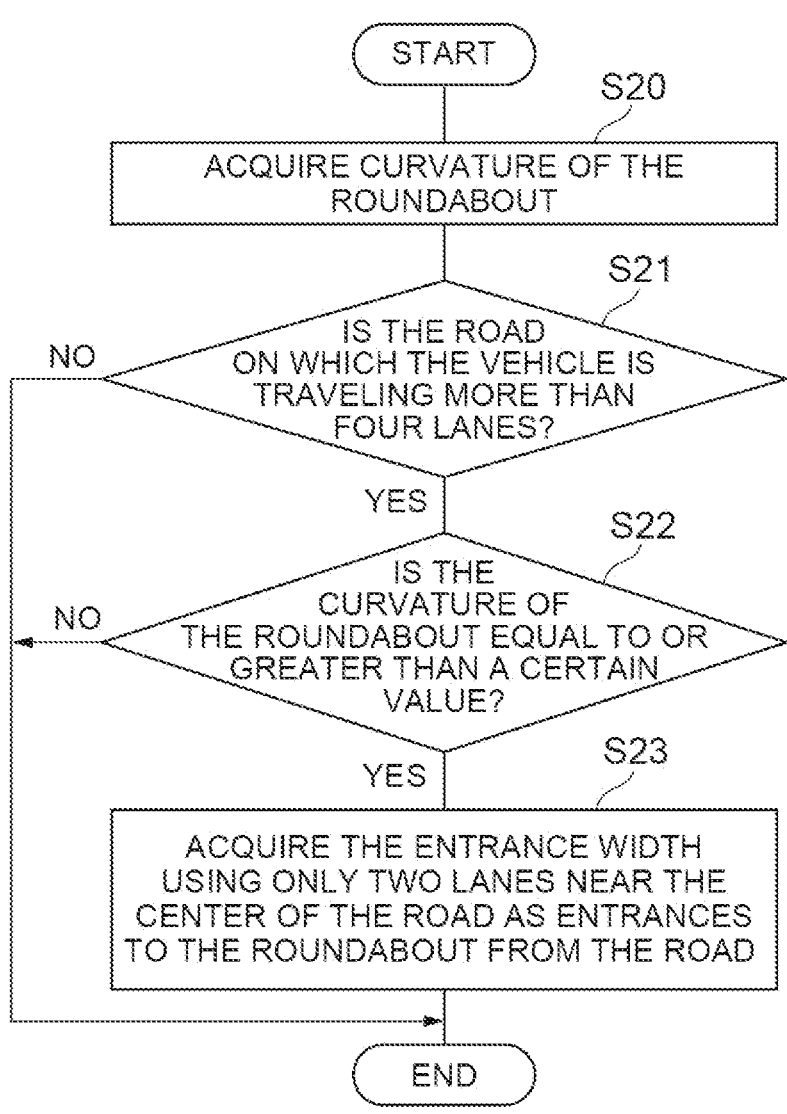

FIG. 4 is a flowchart illustrating an example of entrance width acquisition processing for multiple lanes.

DETAILED DESCRIPTION

Hereinafter, embodiments of the present disclosure will be described with reference to the drawings.

A driving assistance apparatus 100 shown on FIG. 1 is mounted in a vehicle. The device is capable of performing driving assistance of a vehicle. The driving assistance apparatus 100 performs driving assistance by performing vehicle speed assist control. The vehicle speed assist control is control for controlling the vehicle speed of the vehicle so as to become a set vehicle speed set in advance in accordance with the traveling environment of the vehicle. The vehicle speed assist control may be CC [Cruise Control] or ACC [Adaptive Cruise Control].

Configuration of Driving Assistance Apparatus

Hereinafter, the configuration of the driving assistance apparatus 100 will be described with reference to FIG. 1. The driving assistance apparatus 100 includes a driving assistance ECU 10 (Electronic Control Unit). The driving assistance ECU 10 is an electronic control unit that includes a central processing unit (CPU) and a storage unit such as a read only memory (ROM) or a random-access memory (RAM). In the driving assistance ECU 10, for example, various functions are realized by executing a program stored in the storage unit by the CPU. The driving assistance ECU 10 may be comprised of a plurality of electronic units.

The driving assistance ECU 10 is connected to a GNSS receiving unit 1 [GNSS: Global Navigation Satellite System], a front camera 2, an internal sensor 3, a map database 4, and an actuator 5.

The GNSS receiver 1 receives signals from positioning satellites. Thus, the position of the vehicle (for example, the latitude and longitude of the vehicle) is measured. The GNSS receiver 1 transmits the measured position information of the vehicles to the driving assistance ECU 10.

The front camera 2 is an imaging device that images an external situation in front of the vehicle. The front camera 2 is provided, for example, on the rear side of the windshield of the automobile. Therefore, it is possible to capture an image in front of the vehicle. The front camera 2 transmits a captured image in front of the automobile to the driving assistance ECU 10. Further, the front camera 2 may be a monocular camera or a stereo camera.

The internal sensor 3 is a detection device that detects a running state of the vehicle. The internal sensor 3 includes a vehicle speed sensor. The vehicle speed sensor is a detector that detects the speed of the vehicle. As the vehicle speed sensor, for example, a wheel speed sensor that is provided on a wheel of the vehicle or a drive shaft that rotates integrally with the wheel and that detects a rotation speed of the wheel is used. The vehicle speed sensor transmits detected vehicle speed information (wheel speed information) to the driving assistance ECU 10.

The internal sensor 3 may include an accelerometer sensor and a yaw rate sensor. The acceleration sensor is a detector that detects acceleration of the vehicle. The acceleration sensor includes, for example, a longitudinal acceleration sensor that detects acceleration in the longitudinal direction of the vehicle and a lateral acceleration sensor that detects lateral acceleration of the vehicle. The accelerometer transmits, for example, accelerometer information to the driving assistance ECU 10. The yaw rate sensor is a detector that detects a yaw rate (rotational angular speed) around a vertical axis of the center of gravity of the vehicle. As the yaw rate sensor, for example, a gyro sensor can be used. The yaw rate sensor transmits yaw rate information of the detected vehicles to the driving assistance ECU 10.

The map database 4 is a data base that stores map information. The map database 4 is, for example, a hard disk drive (HDD) mounted in the vehicle. It is formed in a storage device such as the like. The map information includes position information of roads and intersections. The map information may include at least one of information on a road type (road classification), information on a road width, and information on a lane width. The road type is regulated by law, for example, and the lane width corresponding to the type may be determined in advance (for example, refer to the fifth fourth section of the road structure example in Japan). That is, even if the lane width information is not included in the map information, the lane width can be obtained from the road type. In addition, the map information may include curvature information of roundabout.

The actuator 5 is a device used for control of vehicles. The actuator 5 includes at least drive actuators and brake actuators. The drive actuators control the amount of air supplied to the engine (throttle opening) in response to a control signal from the driving assistance ECU 10, and control the driving force of the vehicle. The vehicle may be a hybrid electric vehicle (HEV). In this case, in addition to the amount of air supplied to the engine, a control signal from the driving assistance ECU 10 is input to the motor serving as a power source to control the driving force. In this case of a Battery Electric Vehicle (BEV), a control signal from the driving assistance ECU 10 is input to the motor as the power source, and the driving force is controlled. The motor as a power source in these cases constitutes the actuator 5.

The brake actuators control the brake system in response to a control signal from the driving assistance ECU 10, and control the braking force applied to the wheels. As the brake system, for example, a hydraulic brake system can be used. The actuator 5 may include a steering actuator.

Next, the functional configuration of the driving assistance ECU 10 will be described. As shown in FIG. 1, the driving assistance ECU 10 has a roundabout detection unit 11, an entrance width acquisition unit 12, a other vehicle passage time calculation unit 13, a vehicle speed estimation unit 14, a vehicle speed setting unit 15, and a driving assistance unit 16. Some of the functions of the driving assistance ECU 10 described below may be executed in servers capable of communicating with vehicles.

The roundabout detection unit 11 detects roundabout in front of the vehicle based on the captured image of the front camera 2. The roundabout detection unit 11 detects roundabout by pattern matching using, for example, an image pattern associated with roundabout.

The roundabout detection unit 11 may detect roundabout in front of the vehicle based on the position information of the vehicle measured by the GNSS receiver 1 and the map information of the map database 4. The position information of the vehicle is not limited to the measurement result of the GNSS reception unit 1, and may be SLAM [Simultaneous Localization and Mapping] Alternatively, it may be obtained by dead reckoning.

When roundabout in front of the vehicle is detected due to the roundabout detection unit 11, the entrance width acquisition unit 12 acquires the entrance width of roundabout based on the captured image of the front camera 2.

Here, FIG. 2 is a diagram illustrating an example of a situation when the vehicles approach a roundabout. FIG. 2 shows a road L, another vehicle N connected to a vehicle M, a roundabout R. The road L is a road consisting of two lanes of a travelling lane LA and an oncoming lane LB on which the vehicle M runs. A connecting portion between the road L and the roundabout R is an entrance portion of the roundabout R viewed from the vehicle M. The other vehicle N is a car that travels in the roundabout R. Assume that the other vehicle N continues to travel past the entrance portion of the roundabout R as viewed from the vehicle M, as indicated by FIG. 2 arrow.

Also shown in FIG. 2 are a lane width Wa of the travelling lane LA, a lane width Wb of the oncoming lane LB, and an entrance width W, which is the breadth of the entrance portion of the roundabout R. The entrance width W in FIG. 2, for example, is equal to the sum of the lane width Wa and the lane width Wb.

The entrance width acquisition unit 12 acquires the entrance width W of the roundabout R by recognizing lane lines in the captured image, for example. The entrance width acquisition unit 12 may recognize the lane width and the number of lanes of the road L by lane line recognition. The entrance width acquisition unit 12 acquires the entrance width W as the sum of the lane width Wa of the travelling lane LA and the lane width Wb of the oncoming lane LB. Instead of calculating the lane width, the entrance width acquisition unit 12 may directly acquire the entrance width W as the width of the road L by lane line recognition.

The entrance width acquisition unit 12 may acquire the entrance width W of the roundabout R based on the location information of the vehicle M and the map information. It is assumed that the map information includes information on the number of lanes and lane widths in the road L or information on road widths in the road L. The lane width may be obtained from the information of the road type of the road L included in the map information by using the information of the lane width determined in advance according to the road type by the law. The entrance width acquisition unit 12 acquires the entrance width W by acquiring the lane width Wa of the travelling lane LA and the lane width Wb of the oncoming lane LB from map information. The entrance width acquisition unit 12 may acquire the road widths of roads including the travelling lane LA as the entrance width W. The road L connected to the roundabout R is not limited to two lanes, and may be one lane or four or more lanes.

The entrance width acquisition unit 12 may obtain the roundabout R curvatures and use the roundabout R curvatures to adjust the entrance width W. The curvatures of the roundabout R may be acquired from a captured image of the front camera 2. The curvatures of the roundabout R may be acquired from map information or may be acquired from traffic information servers such as public institutions.

The entrance width acquisition unit 12 performs a predetermined calculation so that the entrance width W becomes longer by the curvature of the roundabout R, for example. The entrance width acquisition unit 12 can improve the estimation accuracy of the vehicle speed in the other vehicle N traveling while turning in the roundabout R by taking the curvatures of the roundabout R into consideration. The entrance width acquisition unit 12 may similarly adjust the lane width according to the curvature of the roundabout R.

In a case where the number of lanes on road L is four or more and the curvature of the roundabout R is equal to or greater than a certain value, the entrance width acquisition unit 12 may acquire the entrance width W by using only two lanes close to the center of the road as entrances to the roundabout R. That is, among four or more lanes constituting the road L, lanes other than two lanes near the center of the road are not treated as entrances to the roundabout R from the road L. In this case, the entrance width W is the sum of the lane widths of two lanes near the center of the road. In a case where the road L is four lanes or more, by using only two lanes close to the center of the road where the influence of the curvatures of the roundabout R is small, it is possible to improve the estimation accuracy of the vehicle speed of the other vehicle N described later.

The other vehicle passage time calculation unit 13 calculates a passage time at which the other vehicle N running on the roundabout R passes through the entrance width W based on the captured image of the front camera 2. The other vehicle passage time calculation unit 13 calculates a passage time by an acquisition time of the captured image and image recognition processing. The passage time is, for example, a time from when the leading end of the other vehicle N reaches between lane lines constituting the entrance width W on the captured image to when the entire other vehicle N passes through between the lane lines.

The other vehicle passing time calculation unit 13 may calculate the lane width passing time of the other vehicle N for each of the travel lane LA lane width Wa and the opposite lane LB lane width Wb, respectively. The lane width passing time is, for example, a time until the tip of the other vehicle N passes through between lane lines constituting the travelling lane LA on the captured image. The sum of the lane width passing time of the travelling lane LA and the lane width passing time of the oncoming lane LB corresponds to the above passage time. When the road L includes four or more lanes, the other vehicle passage time calculation unit 13 calculates lane width passing times corresponding to all the lanes.

The vehicle speed estimation unit 14 estimates the vehicle speed of the other vehicle N traveling on the roundabout R based on the acquired the entrance width W of the entrance width acquisition unit 12 and the calculated passage time of the other vehicle passage time calculation unit 13. The vehicle speed estimation unit 14 estimates the vehicle speed of the other vehicle N by dividing the entrance width W by the passage time, for example. When a plurality of other vehicles passing through the entrance portion of the roundabout R can be imaged, the vehicle speed estimation unit 14 estimates the vehicle speeds of the plurality of other vehicles.

When the lane width passing time of the other vehicle N is calculated for each lane of the plurality of lanes, the vehicle speed estimation unit 14 estimates a lane corresponding vehicle speed which is the vehicle speed of the other vehicle N estimated for each lane. The vehicle speed estimation unit 14 estimates the other vehicle N's lane corresponding vehicle speed in the travelling lane LA by dividing the travelling lane LA's the lane width Wa by the lane width passing time corresponding to the travelling lane LA. The vehicle speed estimation unit 14 estimates, for example, the mean value of the lane corresponding vehicle speed as the vehicle speed of the other vehicle N at the entrance portion of the roundabout R.

The vehicle speed estimation unit 14 may weight the lane corresponding vehicle speed of the other vehicle N estimated in the travelling lane LA to be heavier than the lane corresponding vehicle speed of the other vehicle N estimated in the other lanes. The heavier the weighting is, the larger the influence on the final estimation result of the vehicle speed of the other vehicle N is. As the position deviates from the front of vehicle M, the accuracy of position of the other vehicle N that can be recognized from the captured image of the front camera 2 may decrease. Therefore, the vehicle speed estimation unit 14 can improve the estimation accuracy of the vehicle speed of the other vehicle N by increasing the weight of lane corresponding vehicle speed of the other vehicle N that crosses the travelling lane LA in front of the vehicle M. The vehicle speed estimation unit 14 may directly estimate the lane corresponding vehicle speed of the other vehicle N estimated in the travelling lane LA as the vehicle speed of the other vehicle N in the entrance portion of the roundabout R.

When the road L in which the vehicle M runs is four lanes or more, the vehicle speed estimation unit 14 may weight the lane corresponding vehicle speed of the other vehicle N estimated in two lanes closer to the center of the road to be heavier than the lane corresponding vehicle speed of the other vehicle N estimated in the other lanes. By increasing the weight of the lane corresponding vehicle speed of the other vehicle N estimated in the two lanes close to the center of the road where the influence of the curvature of the roundabout R is small, the estimation accuracy of the final vehicle speed of the other vehicle N can be improved. In the vehicle speed estimation unit 14, the mean value of the vehicle speeds of the other vehicle N estimated in two lanes near the center of the road may be estimated as the vehicle speed of the other vehicle N at the entrance portion of the roundabout R. In the case where the number of the road L of the vehicle M is four or more, when only two lanes near the center of the road are used as entrances of the roundabout R, it is not necessary to perform the processing of this paragraph.

The vehicle speed setting unit 15 sets a set vehicle speed for roundabout driving in the vehicle M based on the estimated vehicle speed of the other vehicle (including the other vehicle N) in the vehicle speed estimation unit 14. When the vehicle speeds of a plurality of other vehicles are estimated, the vehicle speed setting unit 15 sets the mean value of the vehicle speeds of the plurality of other vehicles as the set vehicle speed for roundabout traveling. In a case where only the vehicle speed of one the other vehicle N is estimated, the vehicle speed setting unit 15 may set the vehicle speed of the other vehicle N as the set vehicle speed for roundabout traveling.

The vehicle speed setting unit 15 may set a vehicle speed obtained by subtracting a constant speed from a mean value of vehicle speeds of a plurality of other vehicles or a vehicle speed of only one the other vehicle N as a set vehicle speed for roundabout traveling. A median value may be used instead of the average value.

The driving assistance unit 16 performs the vehicle M vehicle speed assist control. Set vehicle speed of the vehicle speed assist control before approaching the roundabout R is set to a set vehicle speed Va. The driving assistance unit 16 controls the vehicle speed of the vehicle M by transmitting a control signal to the actuator 5.

The driving assistance unit 16 decelerates the vehicle M to an entry speed Vb if the roundabout R is detected in front of the vehicle M by the roundabout detection unit 11 while performing the vehicle speed assist control. The entry speed Vb is a pre-set rate for the roundabout R ingress.

The driving assistance unit 16 decelerates so that the vehicle speed of the vehicle M becomes the entry speed Vb just before the entrance of the roundabout R. The entry speed Vb may be adjusted to be at a lower speed than a set vehicle speed Vc for roundabout driving if the vehicle speed setting unit 15 set the set vehicle speed Vc for roundabout driving. If there is a stop line in front of the roundabout R, the driving assistance unit 16 causes the vehicle M to dynamically stop.

When the vehicle M enters the roundabout R, the driving assistance unit 16 executes the vehicle speed assist control by the set vehicle speed Vc for roundabout running set in the vehicle speed setting unit 15. The driving assistance unit 16 runs at a constant speed in the vehicle M with the set vehicle speed Vc in the roundabout R. When the headway between the preceding vehicle and the vehicle M becomes less than the set headway, the driving assistance unit 16 adjusts the vehicle speed so that the headway becomes the set headway. When the vehicle M leaves the roundabout R, the driving assistance unit 16 performs a vehicle speed assist control of the vehicle M so as to return to the original set vehicle speed Va.

The driving assistance unit 16 may enter the roundabout R while running at a constant speed in the entry speed Vb if the vehicle speed setting unit 15 cannot set the set vehicle speed Vc for roundabout running. Thereafter, the driving assistance unit 16 may accelerate to a set vehicle speed Vd (fixed value) determined in advance as a tentative set vehicle speed for roundabout traveling and travel at a constant speed in the roundabout R. When the vehicle M leaves the roundabout R, the driving assistance unit 16 performs a vehicle speed assist control of the vehicle M so as to return to the original set vehicle speed Va. The driving assistance unit 16 may perform automatic stop and automatic start according to the distances between the preceding vehicle and the vehicle M.

Processing Method of Driving Assistance Apparatus

Next, the processing method of the driving assistance apparatus 100 according to the present embodiment will be described. The vehicle speed setting processing for roundabout driving is performed when vehicle speed assist control in the vehicle M is being executed.

As shown in FIG. 3, the driving assistance ECU 10 detects the roundabout R in front of the vehicle by the roundabout detection unit 11 as S10. The roundabout detection unit 11 detects roundabout in front of the vehicle based on, for example, a captured image of the front camera 2.

When the roundabout R in front of the vehicle is detected (S10: YES), the driving assistance ECU 10 transitions to S11. When the roundabout R is not detected in front of the vehicle (S10: NO), the driving assistance ECU 10 ends the vehicle speed setting processing for roundabout traveling.

In S11, the driving assistance ECU 10 decelerates the vehicle M to the entry speed Vb by the driving assistance unit 16. The driving assistance ECU 10 then transitions to S12.

In S12, the driving assistance ECU 10 determines whether the entrance width W of the roundabout R has been acquired by the entrance width acquisition unit 12. The entrance width acquisition unit 12 acquires the entrance width W of the roundabout R by lane line recognition in the captured image, for example. The entrance width acquisition unit 12 may acquire the entrance width W of the roundabout R based on the location information of the vehicle M and the map information.

When the driving assistance ECU 10 determines that the entrance width W of the roundabout R has been acquired (S12: YES), the driving assistance ECU 10 transitions to S13. When the driving assistance ECU 10 does not determine that the entrance width W of the roundabout R has been acquired (S12: NO), the driving assistance ECU 10 terminates the vehicle speed setting processing for roundabout traveling. The case where it is not determined that the entrance width W of the roundabout R has been acquired is a case where the entrance of the roundabout R cannot be imaged by the front camera 2 due to the presence of a large preceding vehicle, or the like.

In S13, the driving assistance ECU 10 determines whether the other vehicle passage time calculation unit 13 calculates a passage time for the other vehicle N traveling in the roundabout R to pass the entrance width W. The other vehicle passage time calculation unit 13 calculates the passage time based on the captured image of the front camera 2. If the driving assistance ECU 10 determines that the passage time has been calculated (S13: YES), the process proceeds to S14. When the driving assistance ECU 10 does not determine that the passage time has been calculated (S13: NO), the vehicle speed setting processing for roundabout traveling ends. The case where it is not determined that the passage time has been calculated is a case where no other vehicle traveling in the roundabout R can be imaged.

In S14, the driving assistance ECU 10 calculates a mean value of vehicle speeds of other vehicles traveling in the roundabout R by the vehicle speed estimation unit 14. The number of other vehicles is not limited to one. The vehicle speed estimation unit 14 estimates the vehicle speed of the other vehicle by dividing the entrance width W by passage time, for example. The driving assistance ECU 10 then transitions to S15.

In S15, the driving assistance ECU 10 sets the set vehicle speed for roundabout driving by the vehicle speed setting unit 15. For example, the vehicle speed setting unit 15 sets a mean value of vehicle speeds of other vehicles traveling on the roundabout R as a set vehicle speed for roundabout traveling of the vehicle M. Thereafter, the driving assistance ECU 10 ends the vehicle speed setting processing for roundabout driving.

FIG. 4 is a flowchart illustrating an example of entrance width acquisition processing for multiple lanes. The entrance width acquisition processing is performed, for example, between S10 of FIGS. 3 and S12.

As shown in FIG. 4, the driving assistance ECU 10 acquires curvature of the roundabout R by the entrance width acquisition unit 12 as S20. The curvature of the roundabout R is acquired from, for example, a captured image of the front camera 2 or map information. The driving assistance ECU 10 then transitions to S21.

In S21, the driving assistance ECU 10 determines whether the road on which the vehicle M travels is more than four lanes by the entrance width acquisition unit 12. The entrance width acquisition unit 12 recognizes the number of lanes of the road L by lane line recognition. When it is determined that the road on which the vehicle M travels has four lanes or more (S21: YES), the driving assistance ECU 10 transitions to S22. In a case where it is determined that the road on which the vehicle M travels does not have four or more lanes (S21: NO), the driving assistance ECU 10 ends the entrance width acquisition processing for multiple lanes.

In S22, the driving assistance ECU 10 determines whether the curvature of the roundabout R is equal to or greater than a certain value by the entrance width acquisition unit 12. If it is determined that the curvature of the roundabout R is equal to or greater than the predetermined value (S22: YES), the driving assistance ECU 10 transitions to S23. When it is not determined that the curvature of the roundabout R is equal to or greater than the predetermined value (S22: NO), the driving assistance ECU 10 ends the entrance width acquisition processing for multiple lanes.

In S23, the driving assistance ECU 10 acquires the entrance width W by the entrance width acquisition unit 12 using only two lanes near the center of the road L as entrances to the roundabout R from the road L. Thereafter, the driving assistance ECU 10 ends the entrance width acquisition processing for multiple lanes.

According to the driving assistance apparatus 100 and the driving assistance apparatus 100 processing method of the present embodiment described above, the vehicle speed of the other vehicle traveling in the roundabout is estimated from the entrance width of the roundabout and the passage time of the other vehicle in front of the vehicle, and the set vehicle speed for the roundabout traveling is set based on the vehicle speed of the other vehicle traveling in the roundabout. This allows setting an appropriate set vehicle speed that is less likely to impede the flow of other vehicles in the roundabout than if the vehicle speed of other vehicles is not considered.

Although embodiments of the present disclosure have been described above, the present disclosure is not limited to the above-described embodiments. The present disclosure can be implemented in various forms in which various changes and modifications are made based on the knowledge of those skilled in the art, including the above-described embodiments.

For example, the driving assistance unit 16 need not necessarily slow down the vehicle M to the entry speed Vb before entering the roundabout R. The vehicle M does not need to have the GNSS receiver 1 and the map database 4 as long as it has the front camera 2. Similarly, the vehicle M does not necessarily need to have the front camera 2 as long as it has the GNSS receiver 1 and the map database 4.

What is claimed is:

1. A driving assistance apparatus for performing vehicle speed assist control for driving a host vehicle at a predetermined set vehicle speed, the apparatus comprising:
a memory storing a program; and
a processor configured to execute the program to:
determine whether a roundabout has been detected in front of the host vehicle based on a captured image of a front camera of the host vehicle, or position information of the host vehicle and map information,
acquire lane widths of a plurality of lanes in a case where a road on which the host vehicle travels toward the roundabout includes the plurality of lanes, acquire a curvature of the roundabout based on the captured image of the front camera or the position information and the map information,
when the road on which the host vehicle travels has four or more lanes and the curvature of the roundabout is equal to or greater than a predetermined value, acquire an entrance width of the roundabout based on only two of the four or more lanes that are closest to a center of the road as an entrance of the roundabout;
calculate, for each of the plurality of lanes including a traveling lane of the host vehicle, a lane width passing time in which an other vehicle traveling on the roundabout passes a lane width, based on the captured image of the front camera, wherein the lane width passing time includes a time until a tip of the other vehicle passes across lane lines for each of the plurality of lanes;
estimate, for each of the plurality of lanes, a lane-corresponding vehicle speed of the other vehicle based on the entrance width and the lane width passing time, and calculate a weighted mean of the lane-corresponding vehicle speeds, wherein a weight assigned to the lane-corresponding vehicle speed for the traveling lane of the host vehicle is greater than weights assigned to the lane-corresponding vehicle speeds for other lanes; and
set a set vehicle speed for the host vehicle to travel on the roundabout based on the weighted mean of the lane-corresponding vehicle speeds.

2. A driving assistance apparatus processing method for performing vehicle speed assist control for driving a host vehicle at a predetermined set vehicle speed, the method comprising:
determining whether a roundabout has been detected in front of the host vehicle based on a captured image of a front camera of the host vehicle, or position information of the vehicle and map information,
acquiring lane widths of a plurality of lanes in a case where a road on which the host vehicle travels toward the roundabout includes the plurality of lanes,
acquiring a curvature of the roundabout based on the captured image of the front camera or the position information and the map information,
when the road on which the host vehicle travels has four or more lanes and the curvature of the roundabout is equal to or greater than a predetermined value, acquiring an entrance width of the roundabout based on only two of the four or more lanes that are closest to a center of the road as an entrance of the roundabout;
calculating, for each of the plurality of lanes including a traveling lane of the host vehicle, a lane width passing time in which an other vehicle traveling on the roundabout passes a lane width, based on the captured image of the front camera, wherein the lane width passing time includes a time until a tip of the other vehicle passes across lane lines for each of the plurality of lanes;
estimating, for each of the plurality of lanes, a lane-corresponding vehicle speed of the other vehicle based on the entrance width and the lane width passing time, and calculating a weighted mean of the lane-corresponding vehicle speeds, wherein a weight assigned to the lane-corresponding vehicle speed for the traveling lane of the host vehicle is greater than weights assigned to the lane-corresponding vehicle speeds for other lanes; and setting a set vehicle speed for the host vehicle to travel on
the roundabout based on the weighted mean of the
lane-corresponding vehicle speeds.

\* \* \* \* \*